March 14, 1967  K. WASSERKAMPF  3,308,531
METHOD OF WELDING ALLOY PINS

Filed Jan. 24, 1962  4 Sheets-Sheet 1

INVENTOR
Kurt Wasserkampf
By

March 14, 1967  K. WASSERKAMPF  3,308,531
METHOD OF WELDING ALLOY PINS
Filed Jan. 24, 1962  4 Sheets-Sheet 2

Inventor:
Kurt Wasserkampf
By

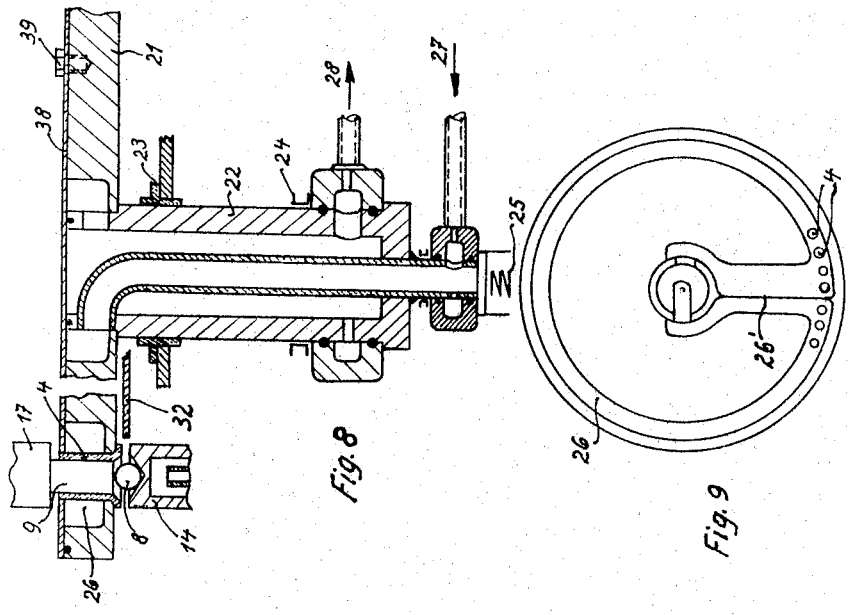
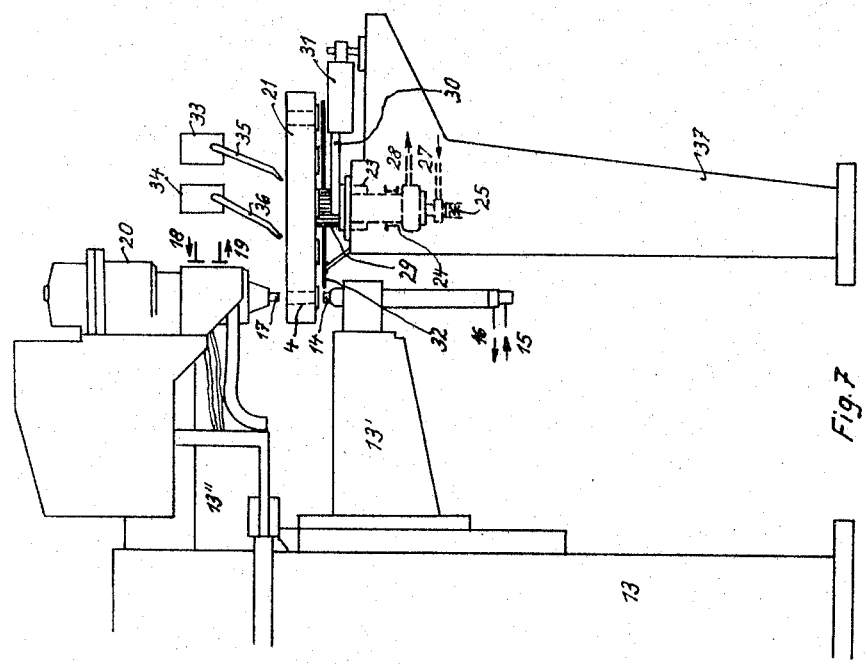

United States Patent Office 3,308,531
Patented Mar. 14, 1967

3,308,531
METHOD OF WELDING ALLOY PINS
Kurt Wasserkampf, Schickstrasse 9,
Berlin-Tegel, Germany
Filed Jan. 24, 1962, Ser. No. 168,557
Claims priority, application Germany, Jan. 27, 1961,
B 61,096
1 Claim. (Cl. 29—471.1)

The present invention relates to a method of improving the welding properties of alloyed pins, especially Sicromal pins. More specifically, the present invention concerns a method which in metallurgical respect and in respect to strength will yield a good welding connection, especially when the problem is involved to weld alloyed pins, as for instance Sicromal pins, onto non-alloyed tube material or tube material which is only slightly alloyed in comparison to Sicromal pins, as is customary for instance with the cooling tubes of furnaces of steam generators. The welding of pins is generally effected in conformity with the known cyc-arc-method and also in conformity with the resistance-butt-welding method. For the last mentioned method some special machines have been developed by means of which the deposit of the pins is effected mechanically, semi-automatically or also fully automatically.

According to this known method, the pins are welded directly onto the base material, as for instance the tube. Alloyed pins, especially Sicromal pins, will, due to their high chromium content and the ingredient alloys of silicon and aluminum, not yield a good welding connection from a metallurgical and stress standpoint. Moreover, the base material, as for instance the tube surface, will be affected. Within the range of the welding connection, the tube surface is alloyed. Oxide inclusions are easily formed and, above all, chromium carbides are formed in view of the carbon from the tube material combining with the chromium from the pins. As a result thereof, a local hardening and brittling of the tube surface will occur.

Inasmuch as the application of pins to the tubes is effected in highly stressed furnace systems for high pressure boilers, the disadvantageous effects are obvious which result from the above influences exerted upon the tube surface.

It is, therefore, an object of the present invention to provide a method which will overcome the above mentioned drawbacks.

It is another object of this invention to provide a method of improving the welding properties of alloyed pins, which will avoid the heretofore encountered disadvantageous effects on the surface of the material which is joined to an article by welding.

These and other objects and advantages of the invention will appear more clearly from the following specification in connection with the accompanying drawing, in which.

FIG. 7 diagrammatically illustrates an embodiment of an automatic welding machine for plating the pins in conformity with the present invention.

Figure 3:
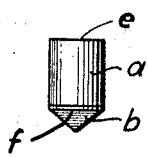
FIGS. 3 and 4 illustrate the same pins as FIGS. 1 and 2 but plated in conformity with the present invention.

FIG. 8 is a vertical section through a portion of the machine illustrated in FIG. 3 but on a larger scale than the latter.

FIG. 9 is a top view of FIG. 8 with the cover plate removed therefrom.

Figure 10:
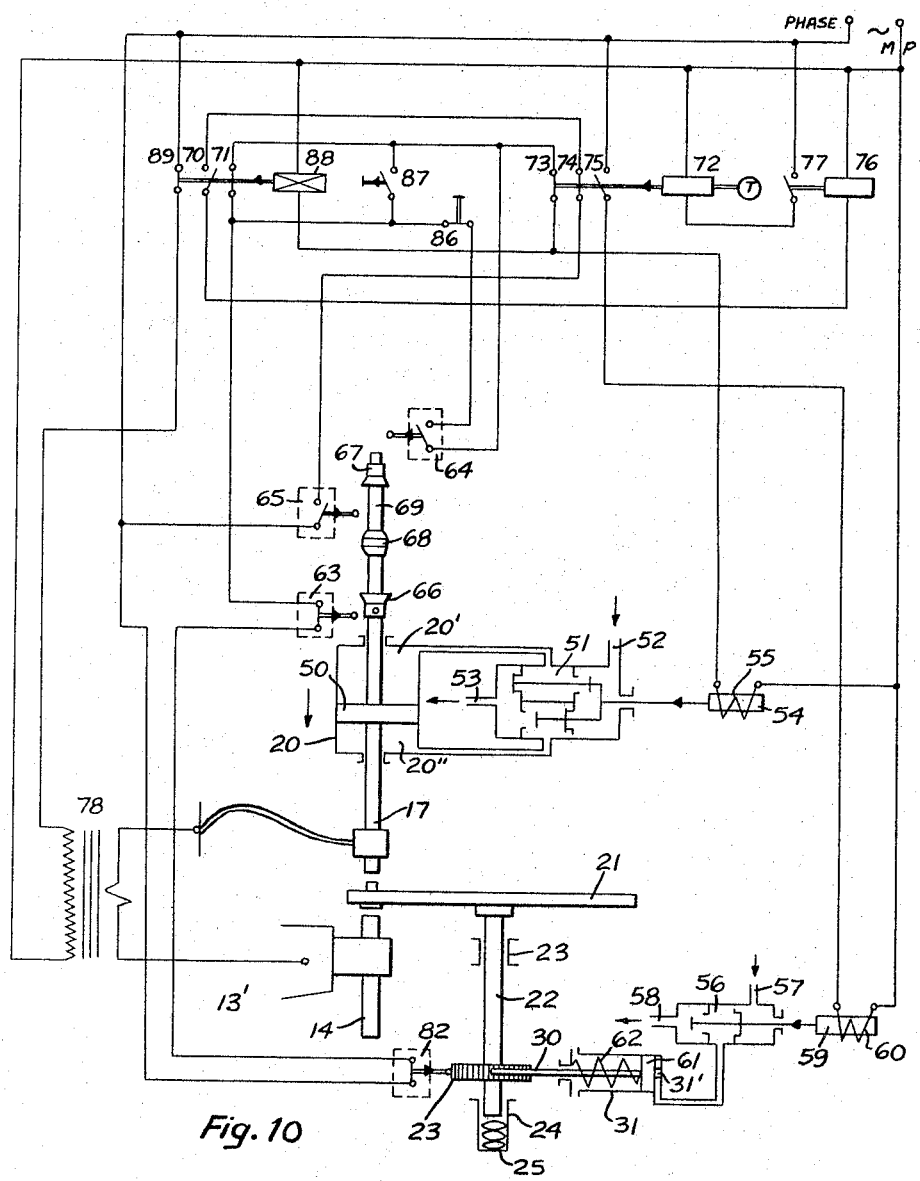

FIG. 10 shows a control circuit for the welding machine of FIG. 7.

The method according to the present invention of improving the possibility of welding alloyed pins, especially Sicromal pins, to base material which is non-alloyed or only slightly alloyed, is characterized in that the pins have that end face thereof which is to be deposited for welding purposes plated with a material substantially of the type of the base material and that the connection of the pins with said base material is effected through the intervention of said plating material.

The connection of the plating substance with the end face of the pins is advantageously effected by means of the resistance-butt-welding method in such a way that simultaneously with the welding operation and while taking advantage of the welding heat and the welding pressure, the plated end face of the pin is shaped in a manner favorable for welding in the form of a cone or a spherical portion or calotte. This is effected by means of a counter electrode which is designed as matrix.

Figures 1, 2:
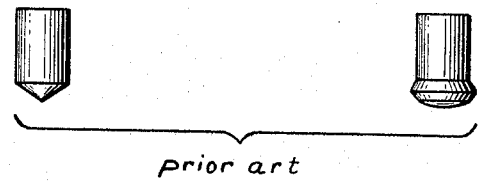
FIGS. 1 and 2 illustrate customary Sicromal pins as they are employed for instance when providing furnace tubes with pins.
Figure 4:
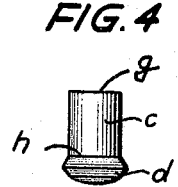

Referring now to the drawing in detail, FIGS. 1 and 2 illustrate heretofore customary Sicromal pins. In contrast thereto, FIGS. 3 and 4 illustrate Sicromal pins according to the invention in conformity with which the cylindrical Sicromal pin $a$ of FIG. 3, which has plane end faces $e$ and $f$, has the end face $f$ plated with non-alloyed or only slightly alloyed material $b$. Similarly, the pin of FIG. 4 has plane end faces $g$ and $h$ of which the end face $h$ is plated with a non-alloyed or only slightly alloyed material $d$.

The cylindrical portion of the plated part is selected so long that an alloying of the pin material into the base material will be impossible. The thickness of the plated layer or portion is approximately from 1 to 2 millimeters.

By employing pins the welding properties of which have previously been improved according to the present invention the harmful influences upon the tube surface will be excluded. It will be appreciated in this connection that the same or nearly the same materials are welded together.

Experience has shown that when welding the plated pin, a noticeably lower electric power is required than when employing non-plated pins so that the procurement of the welding machine will be less expensive.

There will now be set forth by way of example in more detail the method and a device for improving the welding properties of the alloy pins especially Sicromal pins. The material to be plated on the pin is formed into the shape of a ball or lens of the desired plating thickness and of corrsponding volume whereupon the said material is pressed against one end of the cylindrical pin between the electrodes of a welding machine and heated and welded to the pin to form a head to the pin. To this end, the electrode contacting the plating material has its contacting surface provided with a recess of hemispherical or ball shape so that the contacting line between the plating material and the electrode will be a circular line.

According to a further development of the invention, a matrix is employed for the plating of the pin. This matrix consists of the stationary electrode—lower electrode—provided with a recess, a guiding bushing for the pin, which bushing is arranged above and coaxial to said recess and is resiliently held in the direction of its axis, and also of an upper electrode arranged above the guiding bushing and movable in the direction of the axis of said bushing.

When employing a cone-shaped recess in the lower electrode, it is advisable to employ a cone angle of approximately 140°. When a hemispherical or calotte-shaped recess is employed, the radius of said calotte or hemisphere should be less than that of the ball. Furthermore, it is advantageous to provide the lower end of the guiding bushing with a conical taper.

Figures 5, 6:
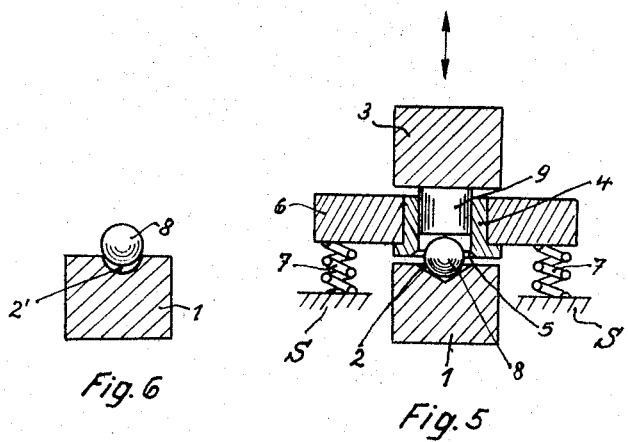
FIG. 5 illustrates in section a matrix for carrying out the method according to the present invention.
FIG. 6 shows a modification of the lower electrode for use in connection with the method according to the invention.

With reference to FIG. 5, the lower electrode 1 is provided with a recess 2 of conical shape which recess, however, according to FIG. 6, may also be hemispherical. Coaxially arranged with the lower electrode 1 but spaced therefrom is an upper electrode 3. The arrangement shown in FIG. 5 furthermore comprises a bushing 4 with a conical taper 5, which bushing is supported by the bushing holder 6. Supported by stationary supports S are springs 7 the upper end of which supports the bushing holder 6. Resting in the recess 2 is a ball 8 of plating material to be plated on a Sicromal pin 9.

FIG. 7 shows a machine generally designated 13 for automatically plating pins in conformity with the present invention. The machine 13 has overhanging arms 13' and 13" and also shows a stationary electrode 14 with supply and discharge lines for cooling water 15 and 16 respectively. The upper electrode 17 is provided with supply and discharge lines 18 and 19 respectively for cooling water. The machine illustrated in FIGS. 7 and 8 furthermore comprises a compressed air cylinder 20, a table 21 with a shaft 22 (see FIG. 8) bearings 23, 24, a spring 25, hollow chambers 26 for the cooling medium, supply and discharge conduits 27, 28 respectively for cooling fluid, a gear 29, a pawl-ratchet mechanism 30, a compressed air cylinder 31, a supporting strip 32 and reservoirs 33, 34 with chutes 35, 36. The rotatable table 21 is arranged in a frame 37 and is provided with a cover plate 38 supported by bolts 39 and sealing the chambers 26 for the cooling fluid.

Inasmuch as the welding of the plating onto the pin is effected by the electric resistance welding method, and since Sicromal has an approximately ten times higher electric conducting resistance than steel, it will be evident that, unless certain provisions are made, the Sicromal pin would at the contacting surface of both materials be heated considerably higher than the steel of which the plating consists with the result that the pin material would be squeezed out to a large extent at the welding area. In order to avoid such situation, the plating material is shaped to a ball 8 which ball, as far as its volume is concerned, corresponds to the volume of the plated pin head *b* or *d*. As stated above in connection with reference to FIGS. 5 and 6, the ball 8 rests in the cone-shaped recess 2 or the hemispherical recess 2' of the lower electrode 1 over which the pin 9 guided by bushing 4 is arranged while above the latter there is provided the upper electrode 3. The ball shape in cooperation with the shape of the recess 2 or 2' will permit an ideal course of the welding operation in welding technological respect. The recess 2, 2' in the lower electrode 1 is advantageous not only for carrying out the plating-welding operation, but the thus obtained conical or hemispherical form of the pin end facilitates the later effected welding of the pin onto tubes inasmuch as the welding current will be concentrated in the contact point between pin and tube. The welding operation is introduced by a pressing stroke of the upper electrode 3 whereby the pin 9 will be pressed upon the ball 8. At the same time the welding current is switched on. At the start of the welding operation, only a point contact will exist between ball 8 and pin 9. Since ball 8 rests in recess 2, 2' of the lower electrode, this contact line is that of a circular line. Thus, in spite of different electric conducting resistances of Sicromal on one hand and steel on the other hand, a concentrated quantity of current will be supplied to the point-shaped contacting area so that pin and ball will be equally heated at the contacting points. The welding operation will thus be introduced in the desired proper manner.

It is, however, to be understood that the plating material may also have a shape other than that of a ball or lens provided that a point contact will be obtained with the pin to be plated and a line or area contact with the lower electrode. The ball or lens shape has the advantage that correspondingly shaped bodies can easily be fed to the points of employment and will always assume the proper position in the matrix without the employment of special auxiliary means.

During the welding operation the ball will, due to the pressure exerted by the upper electrode 3, with progressing softening be formed into the end face of the pin while simultaneously impurities, such as oxides, will be pressed toward the outside. Due to the fact that the welding process takes place within the bushing 4 while the pin moves further into the bushing, a pressing of the material toward the outside and a forming of burr at the connecting point of the plating will be prevented.

The stroke of the upper electrode 3 is tuned to the welding time in such a way that the upper electrode will be seated on the resilient bushing holder 7 only when the welding current has already been turned off. In view of the pressure exerted by the upper electrode 3, bushing 4 is placed into engagement with the lower electrode 1 while the ball 8 is pressed into the recess 2 or 2' of the lower electrode 1 and between the recess of the lower electrode and the conical tapering 5 of the bushing is formed into the head of the pin.

The welding machine illustrated in FIGS. 7 to 10 by way of example for automatically plating pins of the type involved comprises as indicated above a machine frame 13 with an arm 13' carrying the water-cooled lower electrode 14. The upper arm 13" of said machine carries the compressed air cylinder 20 which reciprocates the likewise water-cooled upper electrode 17. The machine furthermore comprises a frame 37 which carries the bearings 23 and 24 having rotatably journalled therein a shaft 22 of the circular table 21. Along the marginal portion of the rotatable table 21 along a circle there are arranged bushings 4 which are evenly distributed along said circle so as to be evenly spaced from each other. The table has an annular recess or chamber 26 for a cooling medium which is supplied to and withdrawn from said recess or chamber 26 through conduits 27 and 28 respectively. The bushings 4 are arranged within the recess or chamber 26 whereby they are effectively cooled. Instead of resiliently journalling the bushings 4 individually (FIG. 5), shaft 22 is displaceable in bearings 23, 24 in longitudinal direction against the thrust of spring 25. Fixedly connected to shaft 22 is a gear 29 which is adapted to be rotated by means of a ratchet-pawl mechanism 30 operable by a pressure fluid cylinder piston system 30, 31. Gear 29 and drive 30, 31 are so dimensioned that with each stroke of the compressed air piston, the table will be rotated by one bushing so that another bushing 4 will take its place below the upper electrode 17. The means for rotating the table 21 are not shown in FIG. 8.

Above the table 21 there is arranged a reservoir 33 for balls, and furthermore a reservoir 34 for pins. From these reservoirs respectively lead feeding troughs 35 and 36 with suitable releasing devices (not illustrated) to the bushings 4 so that one ball each and one pin will at a time be fed to a bushing. The arrangement furthermore comprises a supporting strip 32 for preventing the balls and pins from falling through as long as the respective bushing 4 has not moved above the lower electrode 1. If desired, an automatic ejector may be provided for ejecting the completed plated pins from the bushings. 26' (FIG. 9) designates a partiton between inlet 27 and outlet 28 for the cooling fluid.

In order to assure the course of the operation as it has been described above in connection with FIG. 1 and to couple the mechanism for the welding operation with the rotating mechanism for the table 21, there exists various possibilities of which one will now be described in connection with FIG. 10.

The movements of electrode 17 and table 21 as they are required for a proper functioning of the device, are brought about by pneumatic devices which are electrically controlled and checked.

The air cylinder 20 has reciprocably mounted therein a piston 50 which in the illustrated position of the reversible valve 51 has its upper side in communication with the compressed air conduit 52 so that it will move downwardly. The air from cylinder 20″ below piston 50 may escape through conduit 53. When the current passing through coil 55 is turned off, the armature 54, for instance by spring force, moves toward the left so that now the pressure conduit 52 communicates with the lower cylinder 20″ while the ventilating conduit 53 communicates with the upper cylinder 20′ with the result that the piston 50 moves upwardly.

Table 21 is by means of the pneumatic cylinder 31, piston 61, a pawl (not illustrated) arranged on piston rod 30, and gear 23 rotated by one division as soon as cylinder 31 is supplied with compressed air. The air presses piston 61 toward the left against the thrust of spring 62 when cylinder 31′ communicates with the compressed air conduit 57 of the pneumatic control valve 56. This communication will exist when the armature 59 of the magnetic valve is drawn into the current conducting coil 60. In the illustrated position, coil 60 is without current while the cylinder 31′ communicates with the ventilating conduit 56, and spring 62 has returned piston 61 into its right-hand end position. Nevertheless, the piston 50 moves electrode 17 downwardly when current passes through coil 55 and moves electrode 17 upwardly when no current passes through coil 55. Piston 61 turns table 21 by one division when current passes through coil 60, and returns to its rest position when no current passes through coil 60.

The control of the pneumatic device is effected by the end keys 82, 63, 64 and 65. The contact of the end key 82 is closed only when table 21 is in precisely the correct position relative to the electrodes 17 and 14. The end keys 63, 64 and 65 are actuated by switch cams 66, 67 and 68 which are adjustably arranged on piston rod 69. The end key 63 is opened by switch cam 66 in the lower end position of electrode 17. End key 64 is closed by switch cam 67 in the upper end position of electrode 17. When passing by switch cam 68, key 65 receives a closing impulse.

Keys 82, 63, 64 and 65 are components of an electric circuit which in addition thereto comprises switch 86, key 87, air relay 88 with contacts 89, 70 and 71, time relay with coil 72, contacts 73, 74 and 75, relay 76 with contacts 77 and transformer 78 which latter at its secondary side conveys voltage to the electrodes 17 and 14 when coil 88 is excited and thereby contact 89 is closed. FIG. 10 shows coil 88 energized as it corresponds to the operative condition during the downward movement of piston 5, whereas coils 72 and 76 are de-energized.

When the electrode reaches its lower end position, the switch cam 66 opens the contact of key 63. As a result thereof, the current passing through contacts 71 and 73 to relay coil 88 and coil 55 will be interrupted. Contacts 89 and 71 open and contact 70 closes. The transformer 78 will be switched off, and the valve 51 will be adjusted for upward movement of piston 50.

During the upward movement, the switch cam 68 conveys a closing impulse to key 65. As soon as this happens, voltage passes through contact 74 and now closed contact 70 to the relay coil. Contact 77 closes, coil 72 of the time relay will be energized and contacts 73, 74 and 75 thereon will temporarily be actuated. The closed contact 74 interrupts the energization of coil 76 so that contact 77 opens, and the current to coil 72 of the time relay will be interrupted whereby the latter begins to run its course. The coil 60 receives current through contact 75 so that the table will be turned by one division. The opened contact 73 blocks the current supply to the air relay 38 and magnetic coil so that any actuation of the push button key 87 during this phase of movement of electrode 17 will remain without effect. After the time relay 72 has run its course, the contacts 73, 74 and 75 thereof return into the illustrated rest position.

When electrode 17 has reached its upper end position, the switch cam 67 closes the contact of key 64. As a result thereof, current will pass to coil 88 of the air relay and to coil 55 of the reversible valve 51, said current after proper advancement of table 21 passing through key 82, key 63, closed switch 86, actuated key 64 and contact 73.

The transformer 78 will again be switched on and electrode 17 moves downwardly. When during the downward stroke cam switch 67 again releases the contact of key 64, contact 71 arranged parallel to key 64, which contact 71 has closed when coil 88 was energized, will have taken over the function of key 64 so that the downward movement of electrode 17 will be maintained at the welding voltage made effective through transformer 78. Contact 70 prevents coil 76 from being energized during the downward movement when switch cam 68 passed key 65.

If it is desired to interrupt the course of movement of the electrode 17 at the upper end position thereof, it is merely necessary to open switch 86. As a result thereof, the switch impulse of key 64 becomes ineffective. A new cycle may be initiated by pressing the push button key 87 whereby voltage is given to coil 88 of the air relay and coil 55 of the reversible valve 51 through contact 73. Contacts 89, 70 and 71 will be actuated in the illustrated sense. The closed contact 71 will make sure that the push button key 37 may again be released. In general the remarks apply which have been set forth in connection with the closed switch 86.

Instead of the described control, also an electronic control may be employed. Furthermore, it would be possible to provide an automatic interruption of the welding current which is controlled by the electric resistance of pin and ball which increases with the heating up thereof.

It is, of course, to be understood that the present invention is, by no means, limited to the particular constructions shown in the drawings but also comprises any modifications within the scope of the appended claim.

It is to be noted that the term "Sicromal" as it appears in the specification refers to steel-alloys comprising primarily iron, chromium, silicon and aluminum. Alloys of this type are sold under the trademark "Sicromal" and are produced and marketed by the firm of "Phoenix-Rheinrohr Aktiengesellschaft" in Dusseldorf in Germany. The range of composition of alloys of this type is shown in the booklet entitled Hitzebeständige Stähle, 2. Ausgabe, Phoenix-Rheinrohr AG. Dusseldorf, August 1956. Examples of the range of some of the Sicromal steels is Sicromal 8 with Si 0.6%–0.9%, Mn 1.0% and Cr 6.5% and Sicromal 12 with Si 1.3–1.6%, Mn 1.0% and Cr 23.0–25.0%.

What I claim is:

A method of forming a welded connection of a pin to a base element, in which the body of the pin is composed of Sicromal alloy steel comprising significant amounts of the elements, chromium, silicon and aluminum and in which said base element is composed of metal having non-alloyed steel having no more than insignificant amounts of the above constituents of said pins, said method comprising the steps of electrically resistance welding a head on the end of said pin composed of material similar to the material of said base element and of sufficient size to form a weld for said pin and having said constituents in no more than insignificant amounts, and welding said pin to said base element with said head fused to said element and forming the welded joint between said pin and said base element.

(References on following page)

References Cited by the Examiner

UNITED STATES PATENTS

| | | | |
|---|---|---|---|
| 1,826,549 | 10/1931 | Jardine | 219—104 X |
| 2,231,480 | 2/1941 | Pilger | 219—99 X |
| 2,405,177 | 8/1946 | Beckett | 219—101 |
| 2,441,257 | 5/1948 | Candy | 219—99 X |
| 2,619,715 | 12/1952 | Barr et al. | 29—196.1 X |
| 2,761,208 | 9/1956 | Mitchell | 29—475 |
| 2,819,381 | 1/1958 | Lindow et al. | 219—104 |
| 2,820,135 | 1/1958 | Yamakawa | 29—498 X |
| 2,848,594 | 8/1958 | Aversten | 287—20.2 X |
| 2,858,414 | 10/1958 | Dash | 287—20.2 X |
| 2,963,783 | 12/1960 | Field | 29—190 |
| 3,008,035 | 11/1961 | Smith | 219—101 |
| 3,009,237 | 11/1961 | Lehmeier | 29—190 |
| 3,057,056 | 10/1962 | Folly et al. | 29—475 |
| 3,094,107 | 6/1963 | Gondek | 29—475 X |

JOHN F. CAMPBELL, *Primary Examiner.*

DAVID L. RECK, *Examiner.*

N. F. MARKVA, *Assistant Examiner.*